April 1, 1941.  H. L. PITMAN  2,236,608
TYPEWRITING MACHINE
Filed April 20, 1938   5 Sheets-Sheet 1

INVENTOR
HENRY L. PITMAN,
BY
L. G. Julihn
ATTORNEY

April 1, 1941.                H. L. PITMAN                 2,236,608
                           TYPEWRITING MACHINE
                        Filed April 20, 1938        5 Sheets-Sheet 2
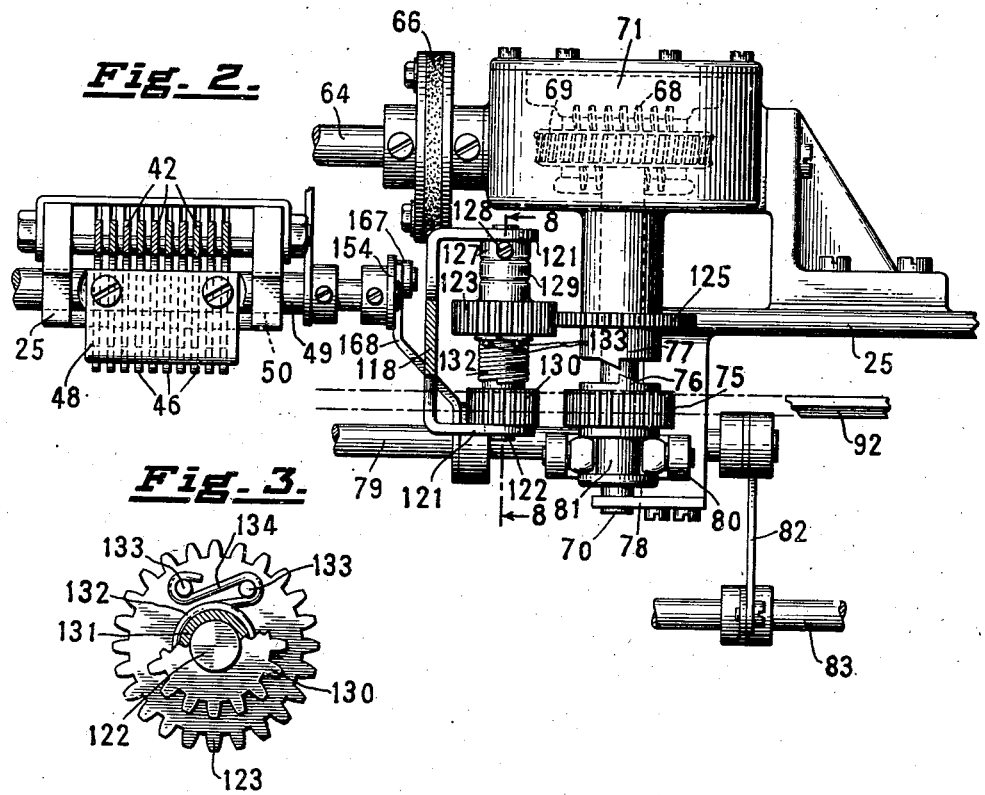
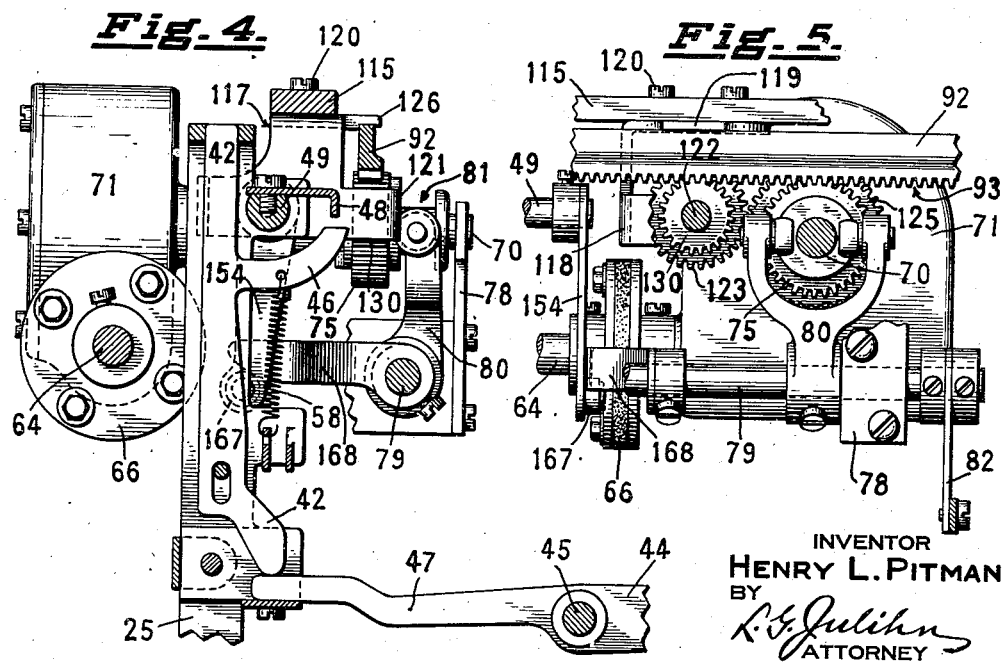
INVENTOR
HENRY L. PITMAN
BY
    *L. G. Julihn*
            ATTORNEY April 1, 1941.  H. L. PITMAN  2,236,608
TYPEWRITING MACHINE
Filed April 20, 1938  5 Sheets-Sheet 3
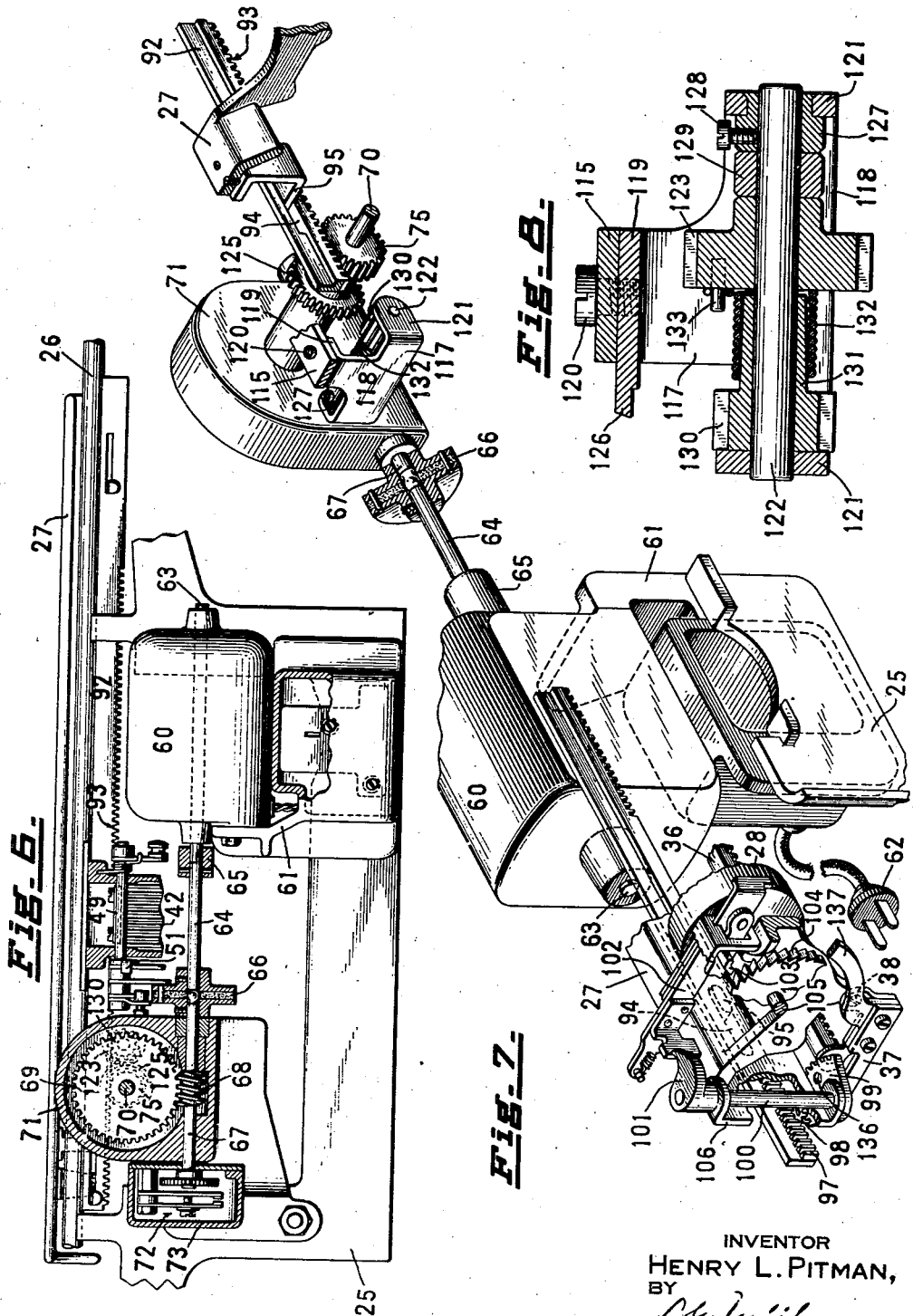
INVENTOR
HENRY L. PITMAN,
BY
ATTORNEY April 1, 1941.  H. L. PITMAN  2,236,608
TYPEWRITING MACHINE
Filed April 20, 1938   5 Sheets-Sheet 4
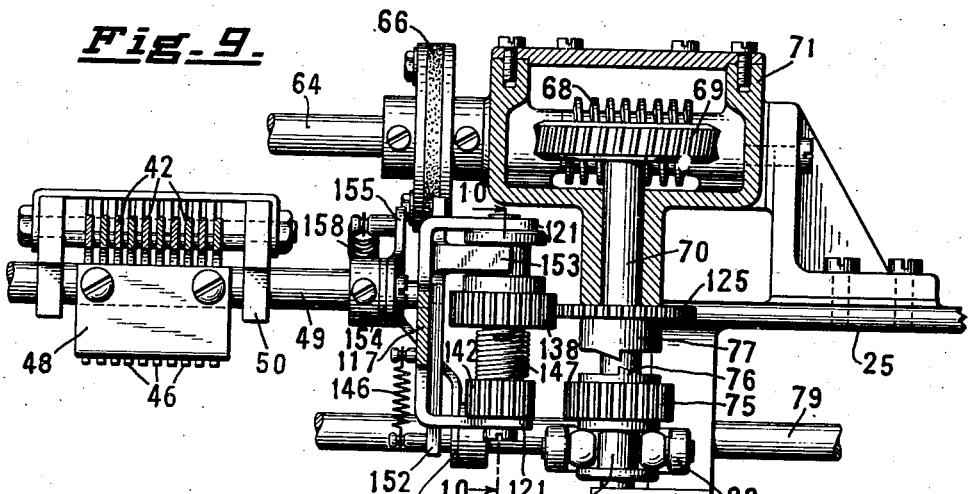
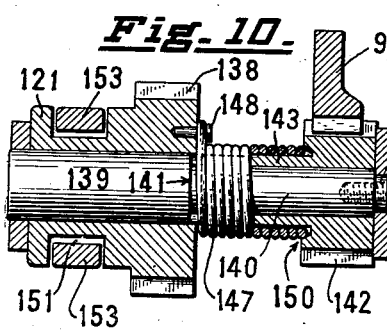
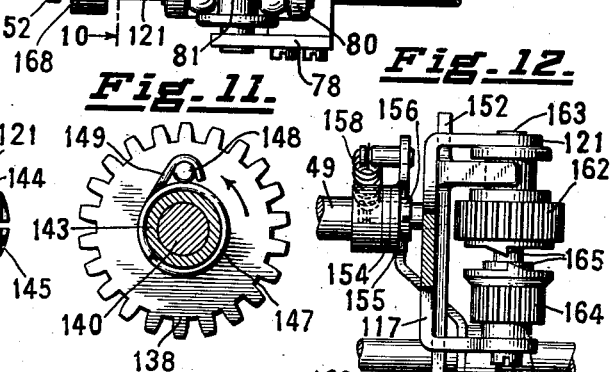
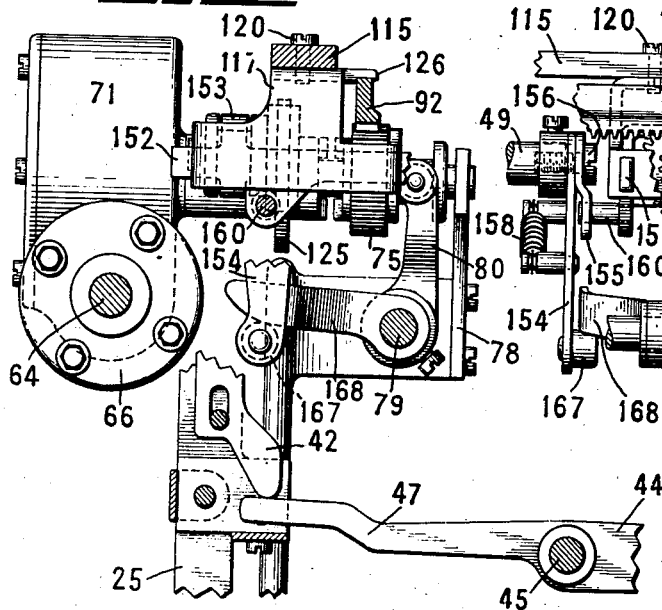
INVENTOR
HENRY L. PITMAN,
BY
ATTORNEY

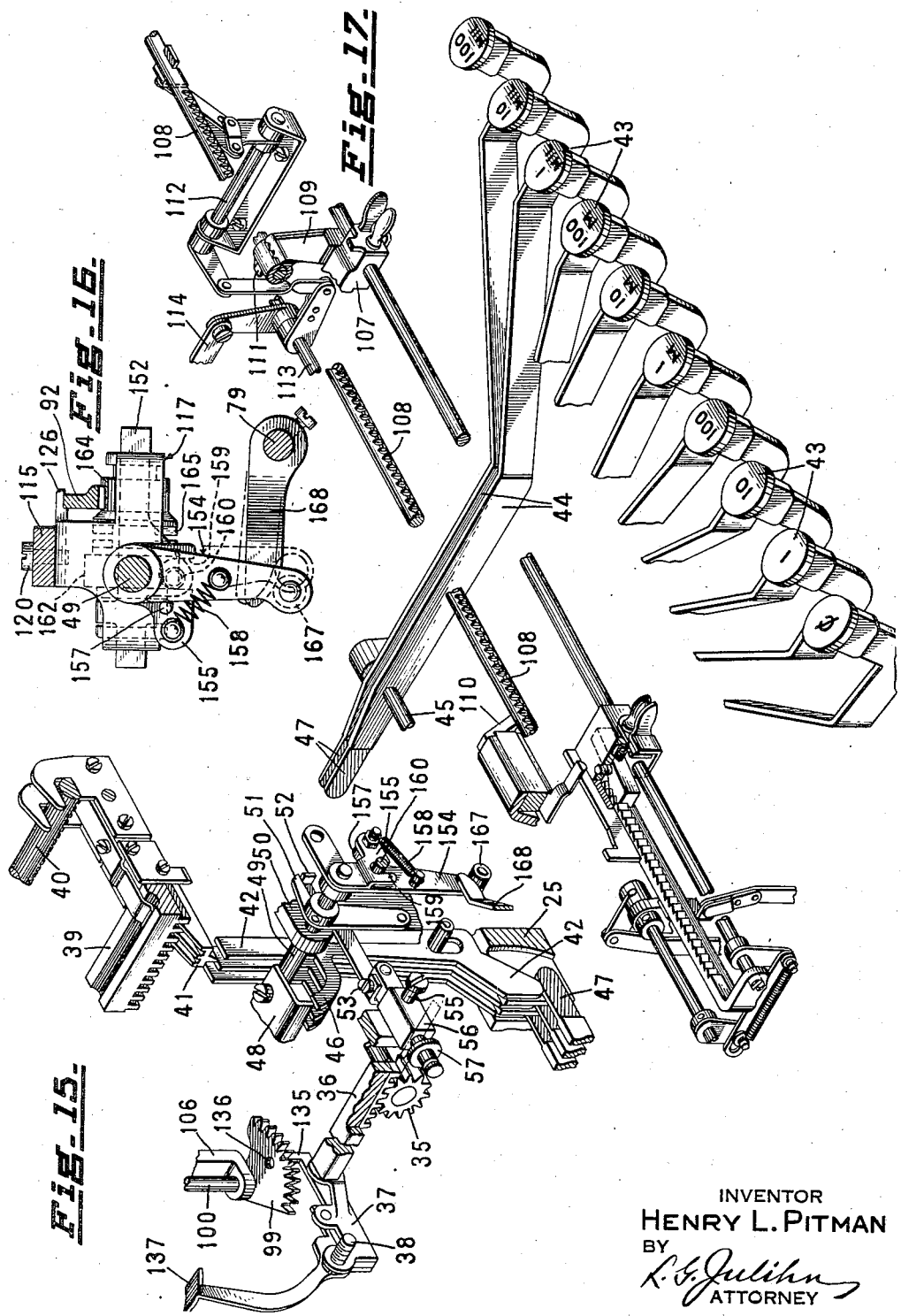

Patented Apr. 1, 1941

2,236,608

UNITED STATES PATENT OFFICE 2,236,608

TYPEWRITING MACHINE

Henry L. Pitman, Hartford, Conn., assignor to Underwood Elliott Fisher Company, New York, N. Y., a corporation of Delaware Application April 20, 1938, Serial No. 203,117

11 Claims. (Cl. 197—64)

This invention relates to tabulating typing machine carriages and deals with devices for counteracting the tendency of the carriage driving means, such as the usual spring motor, to over-speed the carriage in its advance or tabulating movements. A spring motor that is sufficiently strong to quickly accelerate the carriage so as to tabulate the carriage with celerity in a short tabulating jump, will tend to over-accelerate and hence over-speed the carriage in a longer tabulating jump with consequent excessive shock to the carriage arresting parts and noisy carriage arrest.

An object of the invention is to provide a reliable, inexpensive and durable carriage checking device adapted to keep advance of the carriage within a definite speed limit. To this end the invention employs a motor driven element having a predetermined substantially fixed rate of motion that sets a suitable pace for the carriage advance movements, thereby to avoid such excessive shock and noise at the carriage arrest.

The pacing element may be connected between the carriage and motor in such way that, although the carriage is primarily driven in tabulating direction by the spring motor in order that it may be arrested by the tabulating stops, it is constrained to follow but cannot out-speed, nor speed-up or race said element no matter how strong the carriage spring motor may be.

In one form of the invention, a ratchet tooth clutch is employed to connect the motor driven pacing element and the carriage. In order to have the carriage normally entirely free of the pacing element the clutch elements are normally separated and are closed in response to operation of a key which may also be a tabulating key. Such ratchet tooth clutch affords a one way connection between the carriage and the motor driven pacing element so as to permit the latter to continue its movement independently of the carriage after the latter is arrested by means of the tabulating key operated stop device.

In another form of the invention there is a connection, between the carriage and its motor driven pacing element, whereby the tendency of the carriage to over-speed and hence the tendency of the carriage to move relatively to said pacing element automatically causes the carriage to become interlocked with said pacing element so that the latter may check the carriage, the connection being so arranged that the pacing element may continue in its motion independently of the carriage upon arrest of the latter by the tabulating stop. This connection, although effective at operation of the tabulating key, is not dependent upon said operation and, therefore, mechanism for enabling the tabulating key to render the connection effective is eliminated.

Another object of the invention is to provide an inexpensive, efficient form of such automatic carriage and pacing-element interlocking connection and is attained by means of a snubber device between said pacing-element and carriage. A feature of the invention resides in having the snubber device include a helix, as, for example, a helix of spring wire, and a thereto fitted element, preferably a cylinder shaft or collar fitted within the helix. The arrangement may be such that a modicum of relative rotation of the helix and cylinder in one direction immediately causes the helix to take a snubbing grip upon the cylinder and such grip positively checks said rotation. Such helix and cylinder may be suitably applied between the carriage and the pacing-element to enable the latter, through such snubbing grip, to check overspeeding of the carriage. In a direction of relative rotation of the helix and cylinder opposite to that aforesaid, the snubbing effect does not occur and this permits the pacing-element to move independently of the carriage after the latter is arrested by the tabulating stop.

The spring motor usually co-operates with a letter-feed escapement to letter-space the carriage. The pacing-element preferably moves continually during use of the typewriter, and such pacing-element, together with a permanent connection thereof to the carriage, such as a connection including the afore-mentioned helix, is found to conduce to keeping the letter-spacing of the typed characters uniform.

In another form of the invention, the arrangement may be such that the snubbing device including a helix is normally ineffective as a connection between the carriage and the power-driven pacing element and is made effective, to co-operate to control the carriage-advance, in response to operation of a key, for example, the tabulating key.

The carriage may be returned by means of a motor, and a feature of the invention is in the use of such motor to also operate the carriage-pacing element. A motor-driven part adapted for driving a carriage-return rack on the carriage may also drive the pacing-element and the connection of the latter to the carriage may be effected by connecting the pacing-element to such rack.

In the herein-illustrated machine the motor-driven carriage-return rack has a limited longitudinal movement relatively to the carriage, said movement being used to operate automatically the line-space mechanism. A further feature of the invention, where the pacing-element is connected to such rack, is in means whereby said relative movement of the carriage-return rack is blocked in order to enable the pacing-element to function properly.

Other features and advantages will hereinafter appear.

In the accompanying drawings:

Figure 2 is a large scale plan view of one form of the carriage-pacing mechanism.

Figure 3 is a detail view of the connection of the helix to a companion pinion.

Figure 4 is a side elevation of parts seen in Figure 2.

Figure 5 is a front elevation of parts seen in Figure 2.

Figure 6 is a rear elevation showing principally the motor as mounted on the back of the machine frame and the carriage-return and pacing-element connections from the motor to the carriage.

Figure 7 is a perspective of a motor-operable carriage-return and line-space rack and one form of the motor-controlled carriage-pacing device, parts being shown broken away and sectioned, for clarity.

Figure 8 is a section, on the trace 8—8 of Figure 2, showing details of the helical element and co-operating parts whereby the pacing-device controls the carriage.

Figure 9 is a top plan view showing a modification whereby effectiveness of the helical element is controlled by the tabulating mechanism.

Figure 10 is a section, on the trace 10—10 of Figure, 9, showing details of the helical element and co-operating parts adapted for control by the tabulating mechanism.

Figure 11 is a front elevation of the helical element and its connection to a companion pinion, corresponding to Figure 10.

Figure 12 is a plan view of a modification whereby the pacing element may be clutched and unclutched to and from the carriage.

Figure 13 is a side elevation corresponding to Figure 9 and showing part of the connections whereby the tabulating mechanism controls connection of the pacing-element to the carriage.

Figure 14 is a front elevation of some of the parts seen in Figure 13 and additionally shows the flexible connection between the tabulating mechanism and a part controlled thereby to connect the pacing-element to the carriage.

Figure 15 is a perspective of tabulating mechanism and letter-feed mechanism parts and a device whereby line-space movement of the carriage-return rack is silenced through disengagement of the letter-feed rack from the escapement pinion.

Figure 16 is a side elevation showing principally the flexible connection through which a tabulating mechanism part acts to connect the pacing element to the carriage, and Figure 17 is a perspective of a margin-stop-controlled mechanism for disconnecting the carriage from the carriage-return motor that may operate continuously to drive the pacing-element.

Figure 1:
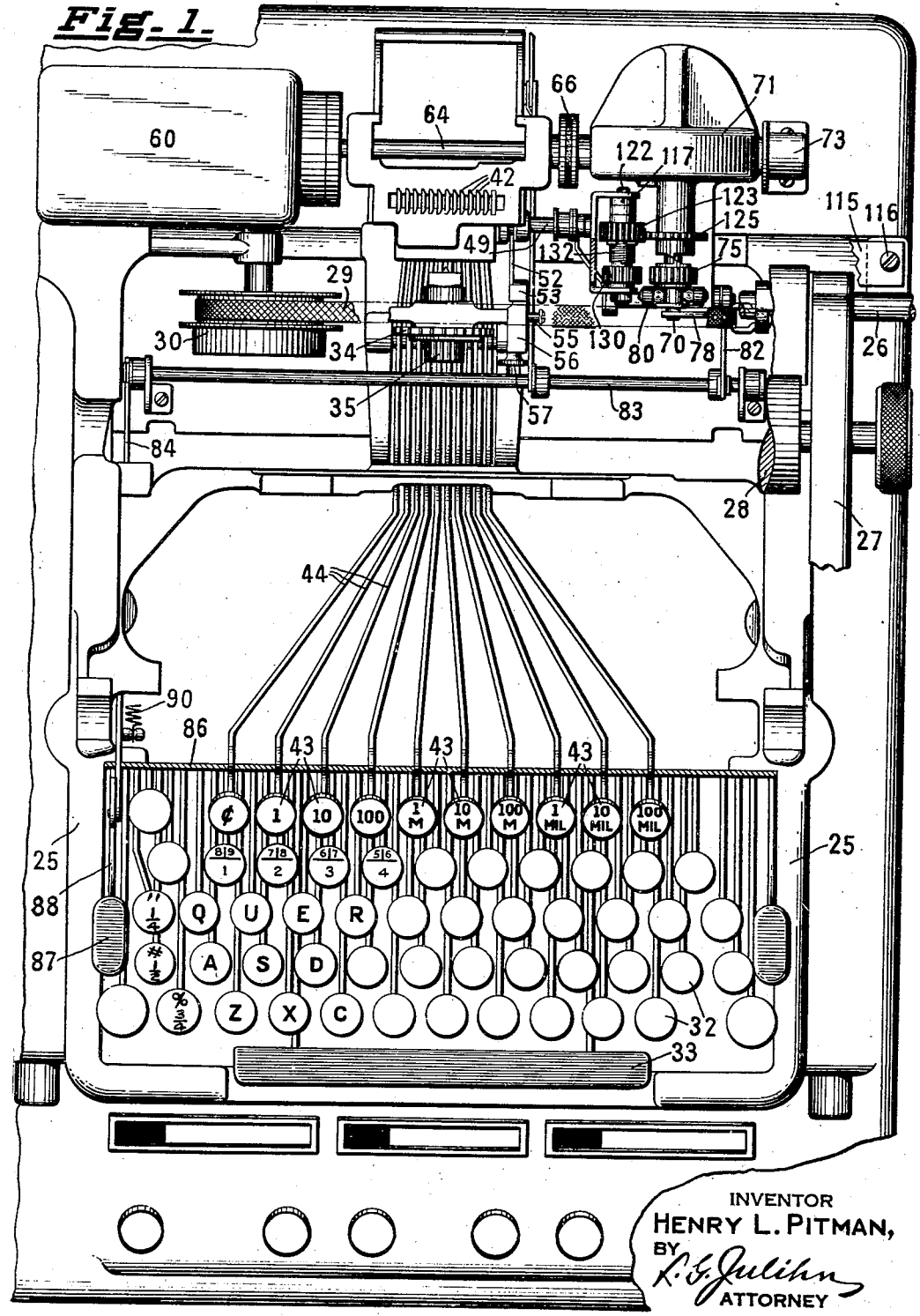
Figure 1 is a top plan view showing the disposition of the invention in an Underwood typewriter, parts of the latter being omitted, for clarity.

The typewriter frame 25, Figures 1 and 6, has a rear rail 26, and a front rail, not shown, upon which a typing carriage 27 carrying a revoluble platen 28, reciprocates. The carriage 27 is connected by a draw band 29 to a spring motor 30 mounted on the frame 25 and constantly urging the carriage leftward in letter-feed or tabulating direction.

At operation of any one of the type-keys 32 or a space-key 33, escapement dogs (not shown) are operated relatively to an escapement wheel 34, Figure 1, in well-known manner to cause the carriage to be letter-spaced by means of the spring motor 30, the escapement wheel 34 having a pinion 35 normally engaging a letter-feed rack 36, Figure 7, on the carriage. The type-keys 32 actuate types not shown, to type upon a work sheet on the platen 28. The letter-feed rack 36 is mounted on arms 37 pivoted to the carriage frame at 38, Figure 7, so as to be liftable clear of the escapement pinion 35 preparatory to tabulating the carriage or shifting it manually in letter-feed direction independently of the escapement devices. The escapement pinion 35 may have a known ratchet connection to the escapement wheel for freely permitting movement of the carriage in rightward or return direction without lifting the rack 36 from said pinion.

The carriage mounts racks 39, 40 for supporting at different stations therealong, a plurality of column stops represented at 41, Figure 15.

Upright denominational stop-rods 42 are mounted in the framework and are selectively liftable upwardly into the path of the column stops 41 by selectively depressing denominational tabulating keys 43, each key 43 having a lever 44 fulcrumed at 45, Figures 4, 13 and 16, in the framework, and each lever 44 having a rear arm 47 under a corresponding stop-rod 42. Each stop-rod 42 has an arm 46 for engaging a universal bar 48 fixed to a rock-shaft 49 journaled in the framework as at 50, Figures 2 and 15. An arm 51, fixed to said rock-shaft 49 acts upon a rearwardly-extending arm 52 of a carriage-releasing lever 53 having a fulcrum 55, Figure 15, in the framework, said lever 53 having another arm 56, presenting a roller 57 under the letter-feed rack 36. Thus, upon depression of any tabulating key 43 and elevation of the corresponding stop-rod 42, the latter, engaging the universal bar 48 rocks the shaft 49 clockwise of Figure 15, thereby rocking the carriage-release lever 53 clockwise to lift the letter-feed rack 36 from the escapement pinion 35 for ensuing advance of the carriage by the spring motor 30. The carriage-advance is arrested when the elevated denominational stop 42 intercepts the nearest column stop 41 on the carriage, whereupon the tabulating key is released, causing retraction of the operated denomination stop 42 by its individual spring 58, Figure 4. At retraction of the denomination stop 42 the universal bar 48, its rock-shaft 49 and the carriage-release lever 44 become restored, permitting the letter-feed rack 36 to reengage the escapement pinion 35 so that the escapement dogs and escapement wheel 34 co-operate finally to hold the carriage in its tabulated-to position.

An electric motor 60 has a supporting bracket 61 attached to the back of the machine-frame 25 and is connectible by a plug 62 to a power line for continuous operation during use of the machine. The motor-drive shaft 63 is extended, by an intermediate shaft 64 and shaft couplings 65, 66, to drive an input shaft 67 of reduction gearing comprising a worm 68 fixed to said input shaft 67 and a worm gear 69 fixed to an output shaft 70, the shafts 67 and 70 being journaled in a reduction-gear housing 71 attached to the back of the frame 25. A suitable motor-current-controlling speed regulator of the centrifugal type is indicated a 72, Figure 6, and may work off the end of the motor-driven input shaft 67 and is enclosed in a casing 73 attached to the housing 71.

A carriage-return pinion 75 is slidable on said output shaft 70 and is normally positioned, Figure 9, so that clutch teeth 76 thereon are separated from a toothed clutch collar 77 fixed to said shaft 70, the latter projecting forwardly from the housing 71 and being journaled at its forward end in a bracket 78 of the framework. A rock-shaft 79 journaled in the framework has fixed thereto a clutch-control arm 80 adapted to engage a groove 81 in the carriage-return pinion 75. Said rock-shaft 79 is connected by linkage 82, Figures 1 and 2, to a rockshaft 83 journaled in the framework and extending leftwardly, Fig. 1, to and connected to a latch link 84 extending through an aperture in a key-lever comb-plate 86 and normally latched over an edge of such aperture, according to known details, not shown, it being sufficient here to explain that depression of a carriage-return key 87 on a lever 88 causes the latter to lift the forward end of the link 84 free of such edge whereupon a link-spring 90 moves the link 84 rearwardly, thereby rocking the shafts 83, 79 to slide the carriage-return pinion 75 rearwardly upon the motor driven output shaft 70 to engage said pinion 75 with the clutch collar 77. The resulting rotation of the pinion 75 causes the latter to drive a rack-bar 92 rightwardly of Figure 7 to line-space the platen 28 and return the carriage to the right.

The carriage-return rack-bar 92 has rack teeth 93 engaging the pinion 75, and also has slots 94 whereby it is fitted to brackets 95 attached to the carriage frame 27, Figure 7. The slots 94 permit endwise movement of said rack-bar 92 relatively to the carriage. This endwise movement of the rack-bar 92 usually occurs before the rack-bar 92 picks up the carriage to return the latter and is utilized to line-space the platen. For this the carriage-return rack is formed with another set of rack teeth 97, Figure 7, working through an idler 98, to rotate a sector 99 and a thereto fastened shaft 100 having at its upper end an arm 101 adapted, as will be clear from Figure 7, to engage a line-space slide 102 carrying the usual line-space pawl 103 that engages a line-space ratchet wheel 104 fixed to the platen axle 105. It will be perceived now that rightward endwise movement of the carriage-return rack-bar 92 relatively to the carriage, operates to line-space the platen, and, this having been accomplished, and the independent movement of the rack-bar 92 arrested, further movement of said rack-bar 92 to the right will return the carriage. The idler 98 and shaft 100 may be journaled in a bracket 106 attached to the carriage frame 96.

A carriage-return-limiting margin-stop 107, Figure 17, is settable at any desired station along a toothed rod 108, by means of a retractable lock-arm 109 adapted to interlock with said rod. A counter-stop 110 on the returning carriage engages a lug 111 on said margin-stop 107 causing the returning carriage to displace said margin-stop 107 and the rod 108 to the right of Figure 16. This rightward movement of rod 108 operates through cranks and linkage 112 to rock a shaft 113, journaled in the framework, counter-clockwise of Figure 16, to rock the carriage-return clutch shaft 79 clockwise of Figure 16 to disengage the carriage-return pinion 75 from the clutch collar 77, thereby disconnecting the carriage from the motor for terminating the carriage-return run; said rock shaft 113 being connected by cranks and linkage 114 to the intermediate rock shaft 83. The rocking of the latter through the rightward movement of the rod 108 moves the latch-link 84 forwardly to latched condition to keep the carriage return pinion 75 disengaged when the carriage recedes from the margin stop 107, and the latter, together with the rod 108, become restored by a spring, not shown, acting on said rod 108.

The structure thus far described operates substantially as in known Underwood typewriters adapted for denominational tabulating and for power line-spacing and carriage-return, except that opening of the carriage return clutch by means of the endwise movable rod 108 is along the lines set forth in my application, Serial No. 57,205, filed January 2, 1936, now Patent No. 2,164,422, issued July 4, 1939.

I will now describe the arrangement whereby the motor 60 co-operates to check excessive speed of the carriage in its tabulating jumps. Figures 1, 2, 3, 5, 7 and 8 illustrate the preferred form of such arrangement.

A cross-bar 115 spans the sides of the typewriter frame 25 and is attached thereto as by screws 116, Figure 1. A bracket 117 for supporting the carriage-pacing parts presently to be described, has a yoke 118 provided with a horizontal tongue 119 for attachment to said cross-bar 115 by screws 120. Said yoke 118 presents ears 121 adapted to support an axle 122 upon which a pinion 123 forming a carriage pacing element may rotate. Referring to Figure 2, said pacing-element or pinion 123 is driven by a gear 125 fastened to the motor-driven output shaft 70. The rear ear 121 of the bracket 117 has a hub 127 and a set screw 128, Figure 8, for retaining the non-rotating axle 122 endwise. A spacer collar 129, Figure 8, is interposed between the carriage-pacing pinion 123 and said hub 127. A projection 126, Figure 4, of the bracket tongue 119 serves to slidably engage the rack-bar 92 and brace the latter against upward displacement.

There is rotatably loose on the axle 122, a pinion 130 meshing with the rack teeth 93 of the carriage-return rack bar 92, Figures 2 and 5. A hub 131 is integral with said pinion 130 and is adapted to fit, Figure 8, within a helical element or helix 132 that is attached to the carriage-pacing pinion 123 as by means of two studs 133 on the face of said pinion 123 interlocking with a reflexly-bent tail part 134 of helix 132, as at Figure 3. The helix 132 is made preferably of steel spring wire closely coiled and its internal diameter should be slightly under size relatively to the external diameter of the hub 131 of the pinion 130 so that said hub 131 has a frictional drag on said helix 132. The helix 132 is wound in such direction that when the carriage, in a tabulating jump, tends to overspeed and hence tends to rotate the thereby driven pinion 130 faster than the motor-driven carriage-pacing pinion 123, the frictional drag between the hub 131 and the helix 132 automatically tends to wind up the helix so that said helix immediately takes a substantially irresistible snubbing grip upon the hub 131 and thereby enables the carriage-pacing pinion 123 to check the carriage-driven pinion 130 and keep the latter and the tabulating jump or advance of the carriage within the speed of rotation of said carriage-pacing pinion 123. As illustrated at Figure 8, the hub 131 may be slightly tapered down toward the rear so that the tendency of the helix to wind up for the snubbing grip starts with the first forward coil or coils of the helix. The amount of hub-taper is small, say, two to five thousandths of an inch in the length of the hub depicted at Figure 8.

It will be obvious that the carriage-checking reaction upon the carriage-pacing pinion 123 can not overspeed or race the motor 60, because transmission of said reaction to the motor is blocked by means of the connection comprising the worm 68 and worm-wheel 69 between said motor 60 and pacing-pinion 123. In other words, although the motor 60 and worm 68 can drive the worm wheel 69 and pacing-pinion 123, the pacing-pinion 123 and the worm-wheel 69 can not overdrive or race the worm 68 and motor 60.

With the helix 132 arranged as described, the carriage is operatively connected permanently to the carriage-pacing pinion 123. Nevertheless, the carriage may be returned freely since the corresponding reverse rotation of the pinion 130 relatively to the motor-driven carriage-pacing pinion 123 is in such direction that the aforesaid frictional drag tends to unwind the helix 132 and thus disables its snubbing action. Similarly, in the tabulating operation, the pacing-pinion 123 may rotate in its motor-driven direction independently of the pinion 130 after the carriage and said pinion 130 have been arrested as by means of a denominational stop 42 and column stop 41, since such independent rotation of the pacing-pinion 123 also tends to unwind the helix 132 and therefore disables its snubbing action.

It is to be understood that during use of the machine, the motor 60 and hence the pacing-pinion 123 and its helix 132 rotate continuously.

It will be perceived that the pacing-pinion 123 primarily restrains overspeeding of the carriage-rack bar 92 and the thereby driven pinion 130. With the rack-bar 92 adapted to move rightward relatively to the carriage for effecting line-spacing at the motor driven carriage return operation as hereinbefore described, it will be further perceived that there is a possibility that the carriage, in tending to overspeed during a tabulating jump, may move in tabulating direction relatively to the pacing-pinion restrained rack-bar 92. To avoid this possibility and enable the carriage-pacing pinion 123 to function at all times, relative movement of the carriage and the rack-bar 92 is caused to be blocked during the tabulating advance of the carriage. For this purpose, referring to Figures 7 and 15, the left one of the arms 37 that support the letter-feed rack 36 is provided with a finger 135 adapted to enter a hole 136 in the line-space sector 99 to block rotation of the latter and hence block advance of the carriage relatively to the pacing-pinion restrained rack-bar 92. When the letter-feed rack 36 engages the escapement pinion 35, the finger 135 is withdrawn from said sector 99. But at operation of a tabulating key and its denominational stop-bar 42, the universal bar 48 and its shaft 49 are actuated to rock the carriage-release lever 53, Figure 15, to lift the letter-feed rack 36 from the escapement pinion 35. This rocks the letter-feed rock-arms 37 and therefore enters the finger 135 into the hole 136 to lock the line-space sector 99 and rack-bar 92 and the carriage against relative movement to prevent the carriage, in a tabulating jump, from advancing relatively to the restrained rack-bar 92.

With the carriage permanently connected to the constantly-rotating pacing-pinion 123 by reason of the permanent frictional drag of the helix 132 upon the hub 131 of the carriage-driven pinion 130, the pacing-pinion 123 also serves to check over-rapid leftward advance of the carriage by hand when the carriage is released by lifting the feed-rack 36 manually from the escapement-pinion 35 by means of the usual finger-piece extension 137 of the feed-rack arm 37, Figures 7 and 15. When the machine is not in use the motor 60 is shut off and hence, the pacing-pinion 123 is at rest and the latter, at such time, serves to prevent accidental advance of the carriage since any tendency to such accidental advance and corresponding tendency of the carriage-driven pinion 130 to rotate would cause the latter to be immediately snubbed and checked by the helix 132 connected to the pacing-pinion 123, the latter being incapable of rotation, when the motor is at rest, by reason of being blocked by means of the worm 68 and worm-gear 69.

The described permanent connection of the continuously-motor-driven pacing-pinion 123, to the carriage, by reason of the permanent frictional drag of the helix 132 upon the hub 131 of the carriage-driven pinion 130, is found to be conducive to uniformity of the letter-spacing of the typed characters.

In a modification, the carriage is controlled by a motor-driven pacing device only during carriage-advance resulting from operation of the tabulating mechanism and, for this purpose, the construction, referring to Figures 9, 10, 11, 13 and 14, is as follows:

A modified carriage-pacing pinion 138 continuously driven by the motor-driven gear 125 rotates on an axle 139 supported in the bracket 117. Said axle has a reduced portion 140, Figure 10, forming a shoulder 141 between which and the forward bracket-ear 121, a pinion 142 and its hub 143 are retained against endwise displacement, said pinion 142 being free to rotate on said reduced portion 140. Said pinion 142 meshes with the teeth 93 of the carriage rack-bar 92. The axle 139 is further reduced at 144 to shoulder against the front bracket-ear 121 and a screw 145 cooperates to retain the axle endwise in the bracket 117.

A close wound helix 147 of spring wire is attached to the pacing-pinion 138 by means of a stud 148 on the face of said pinion engaging a tail 149 of the helix, Figure 11. The inside diameter of the helix 147 is slightly larger, say, one to five thousandths of an inch, than the diameter of the hub 143 so that the helix may normally turn without frictional drag upon said hub. An annular bevel 150 formed at the junction of the pinion 142 and its hub 143 is adapted to constrict the forward coil of the helix 147 when the pacing-pinion 138 and its helix 147 are pushed forwardly from a normally retracted position, so that the helix then drags frictionally upon the hub 143. The bracket-ears 121 are perforated to slidably receive a pusher bar 152 having laterally-projecting tongues 153 engaging the pacing-pinion 138, the latter having a tongue-receiving groove 151.

The universal-bar rock-shaft 49 has fixed thereto an arm 154 and alongside thereof, Figures 14 and 16, is an arm 155 rotatably loose on said shaft 49 and retained between said arm 154 and a headed screw 156 threaded in the shaft 49. A stop 157 in the loose arm 155 normally abuts the edge of the arm 154 under the tension of a spring 158 which thus yieldably connects the two arms 154, 155. The loose arm 155 has a slot 159 in which a stud 160, projecting from the pacing-pinion pusher-bar 152, has side-play. A slightly different relative arrangement of the arms 154, 155 and spring 158 is seen in Figure 15, but obviously operates the same as the Figures 14, 16 arrangement.

It will be obvious now that upon the rocking of the universal-bar shaft 49 through depression of a tabulating key 43 and elevation of its denominational stop 42, the arms 154, 155 and their connecting spring 158 cooperate to move the pusher-bar 152, and thereby the pacing-pinion 138 and its helix 147, forwardly. This causes the forward coil of said helix 147 to be constricted by the bevel 150 so that it may drag frictionally upon the hub 143 of the carriage-driven pinion 142. Under this condition any tendency of the carriage to overspeed in the tabulating jump and therefore rotate the pinion 142 faster than the pacing-pinion 138, will tighten the helix 147 in a carriage-checking snubbing grip upon the hub 143. The universal-bar shaft 49 has excess movement relatively to actuating the pusher-bar 152 and, during said excess movement, the spring 158 yields but keeps the forward coil of the helix constricted by the bevel 150. When the carriage is arrested by the elevated denominational stop 42, the motor-driven pacing-pinion 138 may continue to rotate relatively to the arrested carriage-driven pinion 142 since such relative rotation tends to unwind the helix and disable its snubbing grip substantially as described with reference to the helix 132. Upon release of the tabulating key and withdrawal of its denominational stop 52, the universal-bar rock shaft becomes restored by a suitable spring, not shown, thereby permitting the helix 147 to recede from the bevel 150, thus causing the carriage to be disconnected from the pacing-pinion 138 again. A spring 146, Figure 9, may be applied to the pusher-bar 152, to facilitate the retraction of the pacing-pinion 138. Said retraction releases the helix 147 so that its forward coil is not constricted by the bevel 150.

In another modification, Figures 12 and 16, a carriage-pacing pinion 162 continuously driven by the motor-driven gear 125 is normally disconnected from the carriage and becomes connected to the carriage only upon operation of the tabulating mechanism. Said carriage-pacing pinion 162 is rotatable on an axle 163 and is slidable forwardly along said axle from the normal Figure 12 position to become clutched to a pinion 164 that meshes with the teeth 93 of the carriage rack-bar 92, each pinion 162, 164 having clutch teeth 165. The carriage-driven pinion 164 rotates on a reduced portion of the axle 163, said reduced portion forming a shoulder between which and the forward-bracket ear 121 said pinion 164 is retained endwise. Said reduced portion of the axle 163 and a further reduced portion, at the forward end of the axle, entered into said forward ear 121, and an axle-retaining screw 166 are substantially as described with reference to the axle seen in Figure 10 and are therefore not shown in full detail in Figure 12. A pusher-bar 152 is used for shifting the carriage-pacing pinion 162 and is operated by the universal bar 49 by means of arms 154, 155 and spring 158 substantially as described with reference to the modification that comprises the pacing-pinion 138, Figure 9. Thus, at operation of a tabulating key and elevation of its denominational stop 42, the universal-bar shaft 49 is rocked, causing the pacing-pinion 162 to be pushed forwardly to interlock, by means of the clutch teeth 165, with the pinion 164 so that tendency of the carriage and the pinion 164 to overspeed, in a tabulating jump, is checked by the pacing-pinion 162. The clutch teeth 165 hold only on their sides that cooperate to check overspeeding of the carriage and are beveled on their opposite sides as shown in Figure 12. Thus, when the carriage-driven pinion 164 is arrested, through arrest of the carriage by means of the projected tabulating stop 42, the pacing-pinion 162 may continue to rotate in its motor-driven direction by reason of the bevel-teeth 165 of the pacing-pinion 162 overriding the bevel-teeth 165 of the arrested pinion 164. During and for this overriding action, the spring 158 yields to permit the pacing-pinion 162 to shift rearwardly while the tabulating key is held down. Such overriding of the clutch teeth is of substantially short or momentary duration because the tabulating key is usually released immediately upon arrest of the carriage by the stop 42. At release of the tabulating key, the universal-bar shaft 49 becomes restored and ensuingly a spring such as 146 applied to the pusher-bar 152 restores the latter and the pacing-pinion 162 rearwardly so that the carriage is again disconnected from said continuously-rotating pacing-pinion 162.

The arm 154 may be extended to present a roll 167 for cooperation of said arm 154 with a cam-ended arm 168 fixed on the carriage-return clutch-controlling rockshaft 79 to prevent simultaneous operation of a tabulating key and closing of the carriage-return clutch 76, 77. Figure 16 shows the normal position of said arm 154 in full outline and the normal position of the carriage-return clutch-arm 168 in dotted outline. When a tabulating key is depressed, the arm 154 moves to the dotted-line position, Figure 16, and thereby either restores the arm 168 from the full-line position to the dotted-line position or prevents said arm 168 from moving to the full-line position, thereby preventing closing of the carriage-return clutch 76, 77 during the tabulating operation. Should the carriage be in process of being returned by means of the motor when a tabulating key is depressed, such depression of the tabulating key will operate through the arms 154, 168 to stop the power return of the carriage, by opening the clutch 76, 77 and concomitantly relatching the carriage-return trip or latch link 84, in the event that the returning carriage has not reached the right margin-stop 107.

It will be seen, now, that the described carriage-pacing devices, comprising the pacing-pinion 123 or 138 or 162, operate to limit the speed of the carriage-advance inasmuch as the corresponding carriage-driven pinion 130 or 142 or 162 can not rotate faster than the motor-driven pacing-pinion, and can not overdrive the latter and the motor, since such overdriving is prevented as by means of the worm and worm gear connection, 68, 69, between the pacing-pinion and the motor. The speed of rotation of the pacing-pinion is established according to the desired limit of speed of carriage-advance and is determined by providing a motor 60 of suitable speed, and gearing from the motor to the pacing-pinion proportioned suitably for the desired speed of the pacing-pinion. It will further be seen that the carriage-advancing driver or spring motor 30 may be amply strong to accelerate the carriage quickly up to the limit set by the pacing-pinion so that the carriage is tabulated with celerity in a short tabulating jump. But, since the pacing-pinion thus limits the acceleration of the carriage-advance also in long tabulating jumps, the carriage correspondingly can never be overspeeded by the spring motor no matter how long the tabulating jump is. With excessive speed of carriage-tabulating jumps thus avoided, there are also avoided excessive and wearing shock to the machine and excessive noise at the arrest of the carriage by the tabulating-stop mechanism.

The carriage pacing, shock and noise minimizing features of this invention may be used in combination with a buffer and rebound-controlling device adapted to cooperate with said features to reduce the shock and noise of impact of the carriage with a tabulating stop. Said device may be in the form of a yieldable connection, including a strong shock-cushioning spring, between the carriage proper and the tabulating rack 39, and also including a friction shoe cooperating to cushion the impact and also to counteract the tendency of the carriage and rack to rebound from the tabulating stop at the recovery of the spring, substantially as set forth in my co-pending application, Serial No. 207,062, filed May 10, 1938.

Variations may be resorted to within the scope of the invention, and portions of the improvements may be used without others.

What is claimed as new is:

1. The combination with a typing-machine carriage, means tending to advance said carriage at accelerative speed upon its release from a holding-device, a normally ineffective stop to limit the carriage-advance, and a key operable to release the carriage from said holding-device and render said stop effective, of a rotary element, means independent of said carriage-advancing means for operating said element at a predetermined carriage-pacing speed of rotation, a normally ineffective ratchet coupling rendered effective by operation of said key to connect operatively said carriage to said pacing-element whereby said element checks any tendency of the carriage to outspeed said element, said ratchet coupling permitting said element to continue rotating independently of said carriage after arrest of the carriage by said stop.

2. The combination with a typing-machine carriage, and a driver tending to advance said carriage at accelerative speed upon release of the carriage from a holding-device, of a motor, a carriage-pacing element, a worm and worm-wheel, through which said motor drives said pacing element at carriage-pacing speed, a rack on the carriage, a pinion engaging said rack, and a ratchet-coupling operatively connecting said pinion and pacing element so that said pacing element permits the driver to advance the release carriage but controls the carriage so that the latter does not exceed the speed of said pacing element, the worm and worm-wheel being capable of preventing the accelerating-checking reaction between the carriage and pacing element from accelerating said motor.

3. The combination with a reciprocatory typing carriage, a line-space mechanism thereon, a carriage-return rack movable with and relatively to the carriage, means actuated by the movement of the rack relatively to the carriage, to operate said line-space mechanism, and a tabulating mechanism operable to effect a tabulating jump of the carriage, of means operative to restrain said rack to govern the speed of said tabulating jump, and means, acting concomitantly with operation of said tabulating mechanism, to block the relative movement of the rack and carriage thereby to enable said governing means to fully govern the speed of the tabulating jump of the carriage.

4. The combination with a reciprocatory typing-machine carriage, a driver tending to advance said carriage at accelerative speed, and means normally restraining said carriage, of a motor, a pinion geared to said carriage, a carriage-advance pacing pinion driven by said motor, a normally open clutch-tooth connection between said pinions, means operable to release the carriage from said restraining means for resulting advance to a stop by said driver, and means acting concomitantly with operation of said carriage-releasing means, to close said clutch-tooth connection, whereby to enable said motor-driven carriage-pacing pinion to limit the speed of the carriage-advance as effected by said driver, said clutch-tooth connection being adapted to permit the pacing-pinion to rotate in its motor-driven direction independently of the first pinion when the carriage reaches said stop and the clutch connection remains closed.

5. The combination with a typing-machine carriage, a driver tending to advance the carriage at accelerative speed upon release of the carriage from a holding device, of a rotary element geared to said carriage, a rotary pacing element coaxial with said first element and power driven at a predetermined carriage advance pacing speed, and a coupling, between said elements, including a helix connected to one of said elements, and a part coaxial with said helix connected to the other one of said elements, said helix and part being cooperative to permit unlimited relative rotation of said elements in one direction and so that a modicum of relative rotation of said elements in the opposite direction causes said helix to seize said part to prevent further relative rotation of said elements in said opposite direction, whereby the pacing element checks any tendency of the released carriage in its advance to outspeed such pacing elements and whereby said element may continue rotating independently of the carriage as the latter is arrested.

6. In a typing machine having a reciprocatory carriage and means tending to advance said carriage at accelerative speed upon release of said carriage from a holding device; a mechanism for controlling said speed including, in combination, a motor, a rack on the carriage, a rotary carriage-advance-pacing element driven by said motor, a pinion engaging said rack, and a ratchet coupling operatively connecting said pinion to said pacing element to prevent said carriage in its advance from overrunning said pacing element, said ratchet coupling permitting said motor-driven pacing element to rotate independently of the carriage when the latter is restrained by said holding device and also permitting said carriage to be returned independently of the rotation of said pacing element.

7. In a typing machine having a reciprocatory carriage and means tending to advance said carriage at accelerative speed upon release of said carriage from a holding device; a mechanism for controlling said speed including, in combination, a motor, a rack on the carriage, a rotary carriage-advance-pacing element driven by said motor, a pinion engaging said rack, a ratchet coupling operatively connecting said pinion to said pacing element to prevent said carriage in its advance from overrunning said pacing element, and means supporting said pacing-element, pinion and ratchet coupling in coaxial relation, said ratchet coupling permitting said motor driven pacing element to rotate independently of the carriage when the latter is restrained by said holding device and also permitting said carriage to be returned independently of the rotation of said pacing element.

8. In a typing machine having a reciprocatory carriage and means tending to advance said carriage at accelerative speed upon release of said carriage from a holding device; a mechanism for controlling said speed including, in combination, a motor, a rack on the carriage, a shaft driven by said motor and extending transversely of said rack, a pinion offset transversely from said shaft, said shaft having a driving gear engaging said offset pinion, a pinion engaging said rack and supported coaxially with said offset pinion, and a ratchet coupling operatively connecting said coaxial pinions.

9. In a typing machine having a reciprocatory carriage and means tending to advance said carriage at accelerative speed upon release of said carriage from a holding device; a mechanism for controlling said speed, including, in combination, an electric motor, a rack on said carriage, two coaxially supported rotary elements, namely, a carriage-advance pacer driven by said motor and a pinion engaging said rack, and a helical coupler operatively connected between said elements so that rotation of said pinion relatively to said carriage-advance pacer in one direction, during carriage advance, frictionally causes said helical coupler to seize to enable said pacer to check said pinion, said coupler being yieldable to permit unlimited relative rotation of said elements in the opposite direction.

10. In a typewriting machine having a reciprocatory carriage and means tending to advance said carriage at accelerative speed upon release of said carriage from a holding device; a mechanism for controlling said speed, including, in combination an electric motor, a rack on said carriage, two coaxially supported rotary elements, namely, a carriage-advance pacer driven by said motor and a pinion engaging said rack, a helical coupler disposed between and normally ineffective to operatively connect said elements, means operable to release said carriage from said holding device, and means cooperative with said carriage-releasing means to render said helical coupler effective so that a modicum of rotation of said pinion relatively to said carriage-advance pacer, during advance of the released carriage, causes said helical coupler to seize to enable said pacer to check said pinion.

11. In a typing machine, in combination, a tabulating carriage, spring means for moving the carriage in tabulating direction, a constant speed electric motor, and connections between the carriage and the motor effective during tabulation for limiting the speed of carriage travel in tabulation to a direct ratio with the constant speed of the motor, said connections consisting solely of a ratchet coupling, toothed gearing, and supports therefor, said gearing being non-reversible in respect to preventing the spring-urged carriage from accelerating said motor.

HENRY L. PITMAN.